United States Patent
Mazzocco et al.

(10) Patent No.: US 9,067,474 B2
(45) Date of Patent: Jun. 30, 2015

(54) GEAR WITH IDLE ZONES

(71) Applicant: DENSO International America, Inc., Southfield, MI (US)

(72) Inventors: Nicholas Mazzocco, Clawson, MI (US); Aaron Compton, Pickney, MI (US)

(73) Assignee: DENSO International America, Inc., Southfield, MI (US)

( * ) Notice: Subject to any disclaimer, the term of this patent is extended or adjusted under 35 U.S.C. 154(b) by 228 days.

(21) Appl. No.: 13/836,424

(22) Filed: Mar. 15, 2013

(65) Prior Publication Data

US 2014/0260736 A1 Sep. 18, 2014

(51) Int. Cl.
*F16H 19/08* (2006.01)
*B60H 1/00* (2006.01)

(52) U.S. Cl.
CPC ......... *B60H 1/00857* (2013.01); *Y10T 74/1888* (2015.01); *F16H 19/08* (2013.01)

(58) Field of Classification Search
CPC ....... F16H 19/08; F16H 63/18; F16H 61/682; F16H 2063/3056; F16H 2061/2869; B60H 1/00857
USPC ........... 74/53–56, 96, 98, 434, 435, 439, 448; 454/69–165
See application file for complete search history.

(56) References Cited

U.S. PATENT DOCUMENTS

| | | | | |
|---|---|---|---|---|
| 674,600 | A * | 5/1901 | Chevrette | 139/77 |
| 1,115,557 | A * | 11/1914 | Livermore | 74/439 |
| 1,797,490 | A * | 3/1931 | Wilson | 74/422 |
| 4,258,580 | A * | 3/1981 | Lowe | 74/109 |
| 5,620,301 | A * | 4/1997 | Lawer | 415/150 |
| 6,209,404 | B1 * | 4/2001 | Le | 74/89.18 |
| 6,354,935 | B1 * | 3/2002 | Kurokawa et al. | 454/156 |
| 6,431,266 | B1 * | 8/2002 | Han | 165/204 |
| 6,702,008 | B1 | 3/2004 | Hibino et al. | |
| 7,517,278 | B2 * | 4/2009 | Sokolofsky | 454/152 |

* cited by examiner

*Primary Examiner* — William Kelleher
*Assistant Examiner* — Valentin Craciun
(74) *Attorney, Agent, or Firm* — Harness, Dickey & Pierce, P.L.C.

(57) ABSTRACT

The present teachings provide for a door linkage system including a drive side and a driven side. The drive side includes a drive gear and a drive arm. The driven side includes a driven gear configured to mesh with the drive gear and a guide plate in cooperation with the drive arm. The drive side moves the driven side between an open position and a closed position. Proximate to the open and the closed positions, the drive arm moves the driven side. Between the open and the closed positions, the drive gear moves the driven side.

19 Claims, 3 Drawing Sheets

GEAR WITH IDLE ZONES

FIELD

The present disclosure relates to heating, ventilation, and air cooling (HVAC) systems, and particularly to an HVAC door linkage system including a gear with idle zones.

BACKGROUND

This section provides background information related to the present disclosure, which is not necessarily prior art.

Vehicle heating, ventilation, and air cooling (HVAC) systems include doors to direct airflow. A servo motor typically drives a linkage system that opens or closes one or more doors. The linkage system is often a gear-gear linkage or a pin-groove linkage.

In a gear linkage, a drive gear is directly connected to the servo motor. The drive gear is on a drive side of the linkage and is meshed with a driven gear on a driven side of the linkage. The driven gear rotates the door. Therefore, rotation of the drive gear by the servo motor drives the driven gear, which in turn moves the door to an open position, a closed position, or any desired position therebetween. Gear linkages are used for a variety of reasons, such as the following: the linkage is relatively compact because the drive and driven sides can be positioned close together; and the door can be accurately positioned because the drive and driven gears are continuously meshed with one another. In some instances, the servo motor may not be configured to immediately stop when the door contacts a mechanical stop at either the open or closed position. Because the gears are continuously meshed, continued operation of the motor after the door contacts a mechanical stop may subject the motor to undesirable stress and may damage the door.

In a pin-groove linkage, a drive arm on the drive side is rotated by the servo motor. The drive arm rotates a driven arm on the driven side, which either directly or indirectly moves the door to a desired position. The driven arm defines a track with a pin slidably seated therein. The drive arm is coupled to the pin. As the servo motor rotates the drive arm, the pin is moved through the track, which causes both the driven arm and the door coupled thereto to rotate. To accommodate both the drive and driven arms, the pin-groove linkage requires relatively large packaging, particularly as compared to a gear linkage.

In view of the shortcomings of both gear and pin-groove linkages, such as those described above for example, an improved linkage would be desirable.

SUMMARY

This section provides a general summary of the disclosure, and is not a comprehensive disclosure of its full scope or all of its features.

The present teachings provide for a door linkage system including a drive side and a driven side. The drive side includes a drive gear and a drive arm. The driven side includes a driven gear configured to mesh with the drive gear and a guide plate in cooperation with the drive arm. The drive side moves the driven side between an open position and a closed position. Proximate to the open and the closed positions, the drive arm moves the driven side. Between the open and the closed positions, the drive gear moves the driven side.

The present teachings also provide for a door linkage system. The system includes a drive side and a driven side. The drive side includes a motor, a drive arm, and a drive gear with drive teeth between a first toothless area and a second toothless area. The driven side includes a guide plate in cooperation with the drive arm, a driven gear with driven teeth between a third toothless area and a fourth toothless area, and a door movable between an open position and a closed position. The drive side moves the driven side solely with the drive arm when the door is proximate to the open and the closed positions. The drive side moves the driven side solely through cooperation between the drive teeth and the driven teeth when the door is at an intermediate position between the open and the closed positions.

The present teachings further provide for a door linkage system that includes a motor, a drive gear, a driven gear, a drive arm, a guide plate, and a door. The drive gear includes drive teeth, a first toothless area, and a second toothless area. The drive teeth are between the first and the second toothless areas. The drive gear is driven by the motor. The driven gear includes driven teeth configured to mesh with the drive teeth, a third toothless area, and a fourth toothless area. The driven teeth are between the third and the fourth toothless areas. The drive arm is driven by the motor. The guide plate rotates with the driven gear. The drive arm is coupled to the guide plate. The door is movable between an open position and a closed position by one of the drive gear or the drive arm. Proximate to the open and the closed positions, the drive arm moves the door. At an intermediate position between the open and the closed positions, the drive gear moves the door.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
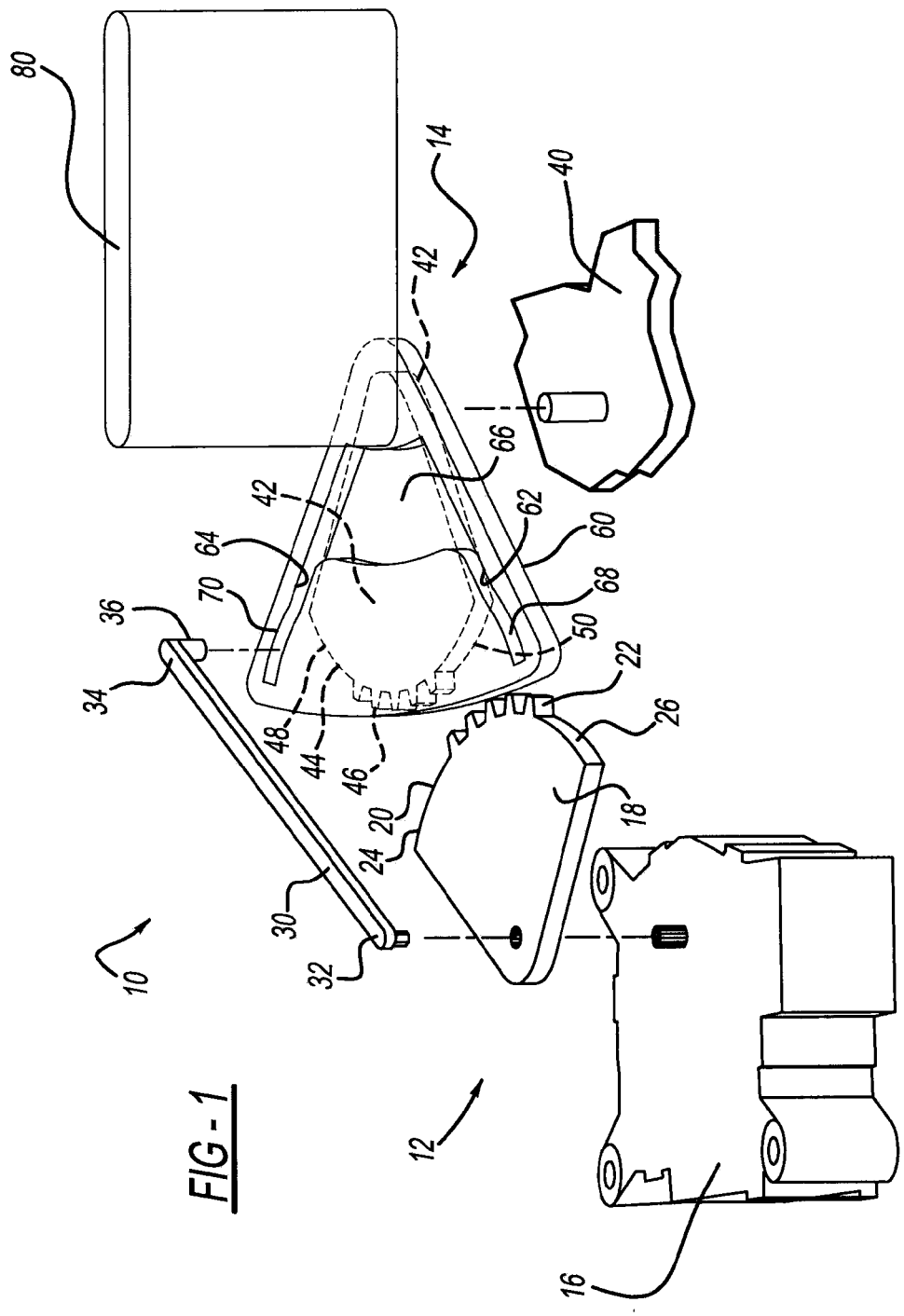
FIG. 1 is an exploded view of a door linkage system according to the present teachings.

A door linkage system according to the present teachings is illustrated in FIG. 1 at reference numeral 10. The door linkage system 10 is generally described herein as a heating, ventilation, and air cooling (HVAC) door linkage for a vehicle HVAC system. However, the door linkage system 10 can be used with any suitable HVAC system or with any system generally that includes movable doors.

The door linkage system 10 includes a drive side 12 and a driven side 14. The drive side 12 generally includes a servo motor 16 and a drive gear 18 mounted thereto. The servo motor 16 can be any motor suitable to rotate the drive gear 18. The drive gear 18 includes a distal surface 20, which has a generally arcuate shape. Extending from the distal surface 20 are a plurality of spaced apart drive teeth 22. The drive teeth 22 extend across less than an entirety of the distal surface 20. Therefore, at a first end of the distal surface 20 is a first toothless area 24. A second toothless area 26 is at a second end of the distal surface 20 that is opposite to the first end. The drive teeth 22 extend along an area of the distal surface 20 that is between the first toothless area 24 and the second toothless area 26.

The drive side 12 further includes a drive arm 30. The drive arm 30 includes a proximal end 32 and a distal end 34, which is opposite to the proximal end 32. The proximal end 32 is also mounted to the servo motor 16 such that the drive arm 30 rotates in unison with the drive gear 18. The drive arm 30 can also be mounted to the drive gear 18. The drive arm 30 and the drive gear 18 rotate in generally planar, spaced apart planes. The distal end 34 includes a pin 36, which is coupled with the driven side 14 as described herein.

On the driven side 14 is a mounting surface 40 to which a driven gear 42 rotatably coupled to. The driven gear 42 can be coupled to the mounting surface 40 in any suitable manner to allow the driven gear 42 to mesh with, and thus be rotated by, the drive gear 18 as further described herein. For example, the driven gear 42 and the drive gear 18 are arranged in a common horizontal plane.

The driven gear 42 generally includes a distal surface 44 with driven teeth 46 extending therefrom. The distal surface 44 is generally arcuate and is generally a mirror image of the distal surface 20 of the drive gear 18. The driven teeth 46 are spaced apart and extend along generally an intermediate portion of the distal surface 44. The driven gear 42 is positioned and the driven teeth 46 are spaced, such that the driven teeth 46 can mesh with the drive teeth 22 of the drive gear 18. The distal surface 44 further includes a first toothless area 48 on a first side of the driven teeth 46 and a second toothless area 50 on a second side of the driven teeth 46. When the drive teeth 22 are not meshed with the driven teeth 46, the drive and driven gears 18 and 42 are rotated such that the first toothless areas 24 and 48 face one another, or the second toothless areas 26 and 50 face one another, as described herein.

The driven side 14 further includes a guide plate 60. The guide plate 60 can be rotatably mounted at the driven side 14 in any suitable manner such that it rotates in unison with the driven gear 42. For example, the guide plate 60 can be mounted to the mounting surface 40, or mounted directly to the driven gear 42 as illustrated. The guide plate 60 is in a plane extending parallel to, and vertically spaced apart from, each of the drive gear 18 and the driven gear 42.

The guide plate 60 defines a first track 62, a second track 64, and an intermediate or transition area 66 between the first track 62 and the second track 64. The first track 62 and the second track 64 extend from opposite ends of the transition area 66. The first and second tracks 62 and 64 generally extend beyond the distal surface 44 of the driven gear 42, but in a plane spaced apart therefrom. The area of the distal surface 44 including driven teeth 46 is about equidistant between the first track 62 and the second track 64. The drive arm 30 extends from the drive side 12 to the driven side 14, and the pin 36 of the drive arm 30 is seated in the first track 62, the second track 64, or the transition area 66 to couple the drive arm 30 to the guide plate 60, as further described herein. The transition area 66 is wider than each of the first and the second tracks 62 and 64, and thus the pin 36 can pass across the transition area 66 without contacting sidewalls thereof, and without transferring rotational torque to the driven side 14.

The first track 62 includes a first distal portion 68, and the second track 64 includes a second distal portion 70. The first and second distal portions 68 and 70 are generally curved to match an arc of rotation of the drive arm 30, such that the drive arm 30 can move along the first distal portion 68 and the second distal portion 70 without causing the guide plate 60 to rotate, as further described herein. Between the first distal portion 68 and the transition area 66, the first track 62 is generally straight. Similarly, the second track 64 is generally straight between the second distal portion 70 and the transition area 66.

The driven side 14 further includes a door 80. The door 80 can be any suitable door, such as an airflow directional door of a vehicle HVAC system. The door linkage system 10 is operable to move the door 80 to an open position and a closed position, as well as any intermediate position therebetween. Rotation of the driven gear 42 and the guide plate 60 rotates the door 80. The door 80 can be directly and rigidly coupled to the driven gear 42 and/or the guide plate 60 (as illustrated). The door 80 may also be mounted to the mounting surface 40 in any suitable manner such that rotation of the guide plate 60 and the driven gear 42 will rotate the door 80.

Figure 2A:
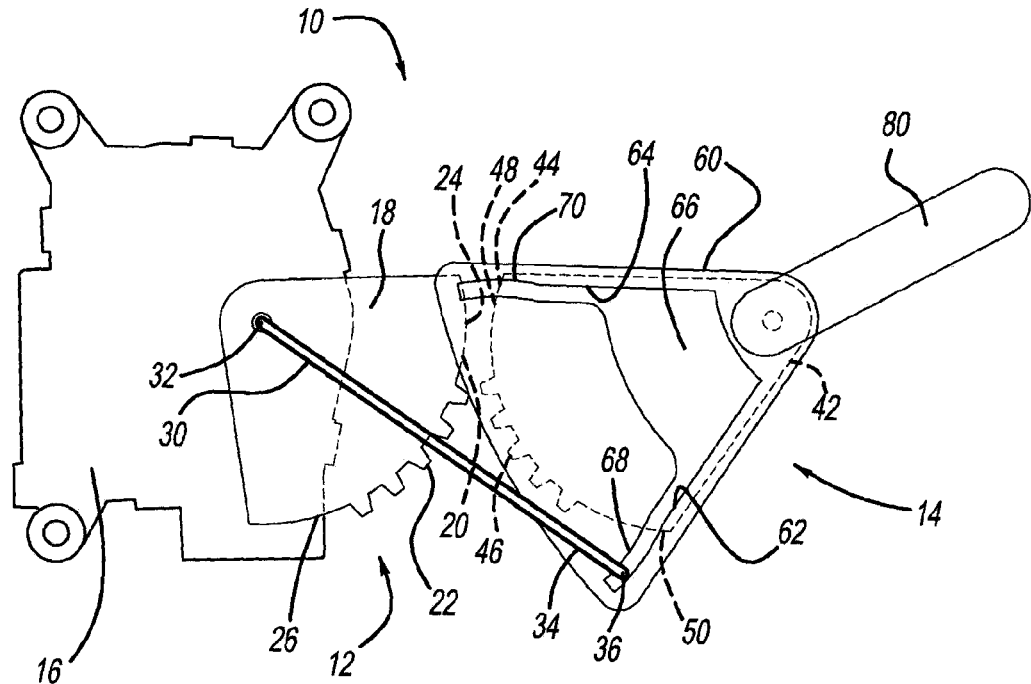
FIG. 2A illustrates the door linkage system of FIG. 1 in an open position.

FIG. 2A illustrates the door 80 in an open position. To reach the open position, the drive gear 18 and the drive arm 30 are rotated by the servo motor 16 such that the pin 36 connected to the distal end 34 of the drive arm 30 is seated in the first distal portion 68 of the first track 62. Because the first distal portion 68 is curved to match the arc along which the distal end 34 rotates, as the pin 36 moves across the first distal portion 68, the guide plate 60 will not rotate and thus the door 80, which rotates with the guide plate 60, will not rotate either. Therefore, if the door 80 is in contact with a mechanical stop at the open position, for example, additional rotation of the drive arm 30 by the servo motor 16 will not result in undesirable stress on either the servo motor 16 or the door 80.

Figure 2B:
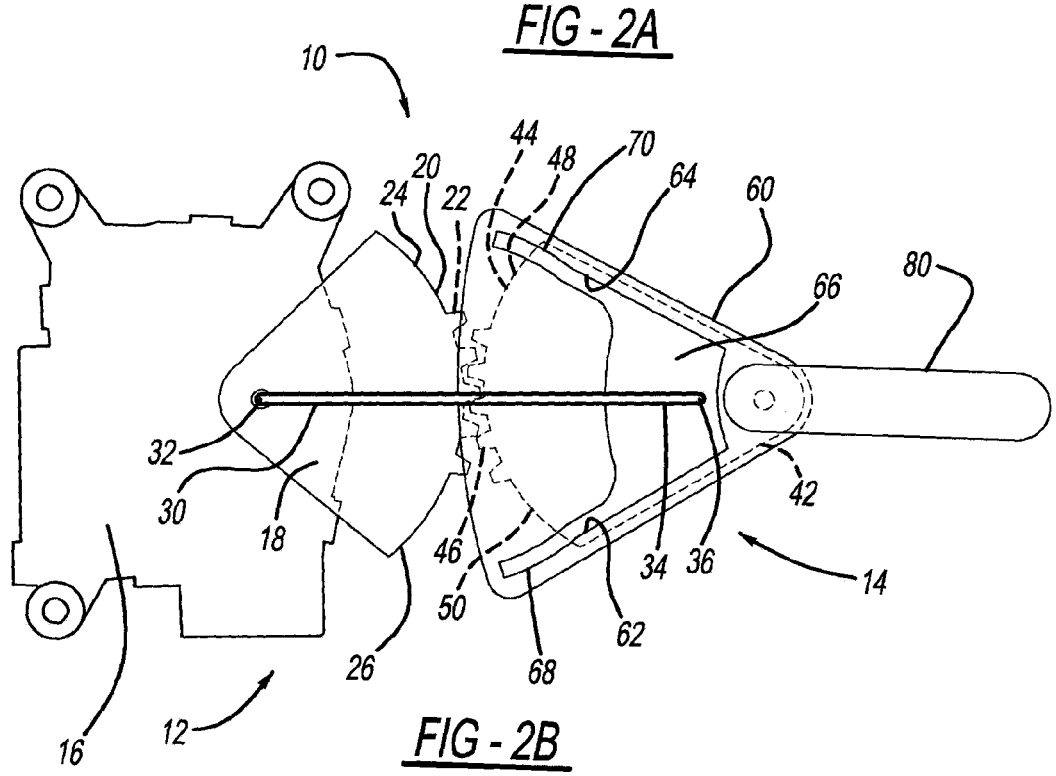
FIG. 2B illustrates the door linkage system of FIG. 1 in an intermediate position.

FIG. 2B illustrates the door linkage system 10 in an intermediate position in which the door 80 is rotated approximately 30 degrees clockwise from the open position of FIG. 2A. To move the door 80 from the open position of FIG. 2A to the intermediate position of FIG. 2B, the servo motor 16 rotates the drive gear 18 and the drive arm 30 about 30 degrees counterclockwise. As the drive arm 30 rotates, the pin 36 moves through the first track 62 from the first distal portion 68 and towards the transition area 66. As the pin 36 moves through the first track 62, the pin 36 moves counterclockwise, which causes the guide plate 60 and the door 80 to rotate counterclockwise. As the pin 36 moves through the first track 62, the first toothless area 24 of the drive gear 18 and the first toothless area 48 of the driven gear 42 face one another, and the drive teeth 22 and the driven teeth 46 do not mesh. Therefore, as the pin 36 moves through the first track 62, rotation of the guide plate 60, the driven gear 42, and the door 80 results solely from force exerted by the pin 36 against side walls of the first track 62.

As the pin 36 moves out from within the first track 62 and into the transition area 66, the drive teeth 22 of the drive gear 18 and the driven teeth 46 of the driven gear 42 mesh with one another to transfer force, such as torque, from the drive side 12 to the driven side 14. When the pin 36 is in the transition area 66, the drive arm 30 is inoperable to transfer force from the drive side 12 to the driven side 14 because the pin 36 does not contact sidewalls of the transition area 66. As compared to a pin-groove linkage for example, the force transfer is more accurate because the drive and driven teeth 22 and 46 are meshed with one another, which provides more precise control over the door 80.

Figure 2C:
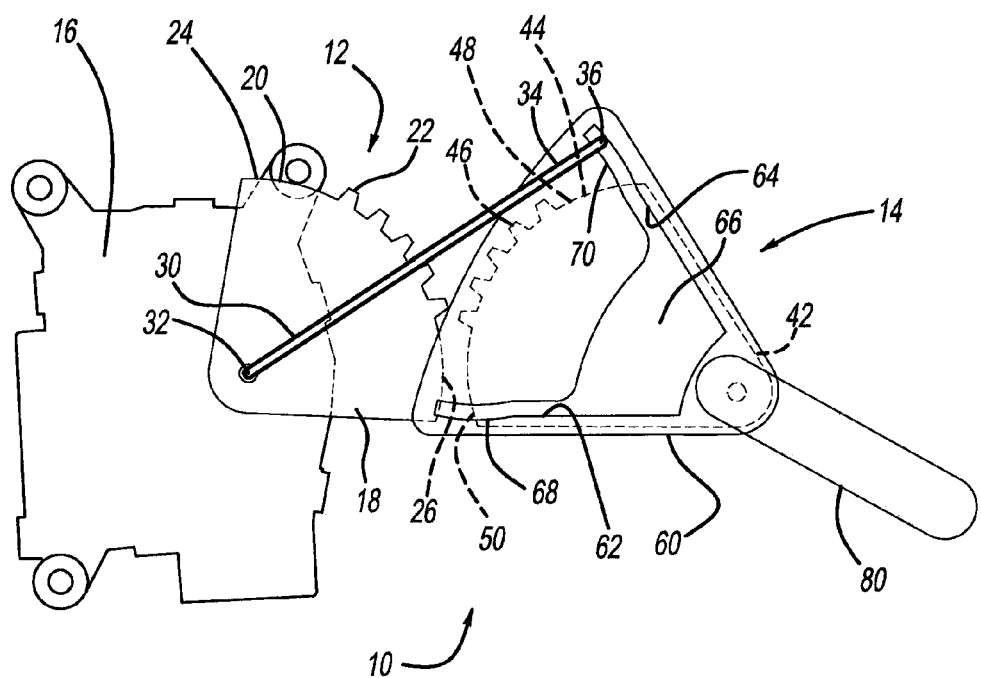
FIG. 2C illustrates the door linkage system of FIG. 1 in a closed position.

FIG. 2C illustrates the door 80 in a closed position. In the closed position, the door 80 is rotated about 30 degrees clockwise from the intermediate position and about 60 degrees clockwise from the closed position. To move the door 80 from the intermediate position of FIG. 2B to the closed position of FIG. 2C, the servo motor 16 rotates the drive arm 30 and the drive gear 18 counterclockwise. As the drive gear 18 and the drive arm 30 rotate, force is initially transferred from the drive side 12 to the driven side 14 through cooperation between the drive teeth 22 and the driven teeth 46. As the drive side and the driven side 12 and 14 rotate, the pin 36 moves from the transition area 66 into the second track 64. As the pin 36 moves into the second track 64, the second toothless area 26 of the drive gear 18 and the second toothless area 50 of the driven gear 42 move closer together, and the drive and driven teeth 22 and 46 decouple from one another. Therefore, once the pin 36 is within the second track 64, the guide plate 60 is rotated solely by the drive arm 30. The drive arm 30 rotates the guide plate 60 until the pin 36 reaches the second distal portion 70. Because the second distal portion 70 is curved along an arc that generally matches the arc along which the pin 36 moves, movement of the pin 36 through the second distal portion 70 does not transfer torque from the drive side 12 to the driven side 14, and thus does not rotate the door 80 further. As a result, if the door 80 contacts a stop at the closed position, further rotation of the drive arm 30 by the servo motor 16 will not place undesirable strain on either the servo motor 16 or the door 80.

The door linkage system 10 can be modified in any suitable manner to meet the requirements of a variety of different applications. For example, although the door 80 is described and illustrated as generally rotating 60 degrees from the open position of FIG. 2A to the closed position of FIG. 2C, the door linkage system 10 can be modified to rotate the door 80 across a larger or smaller area.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door linkage system comprising:
a drive side including a drive gear and a drive arm having a pin extending in a direction parallel to an axis of rotation of the drive gear;
a driven side including a driven gear configured to mesh with the drive gear and a guide plate in cooperation with the drive arm, the guide plate defining a receptacle into which the pin extends in order to couple the drive arm to the guide plate;
wherein:
the drive side moves the driven side between an open position and a closed position;
proximate to the open and the closed positions the drive arm moves the driven side by force exerted by the pin against the receptacle of the guide plate; and
between the open and the closed positions, the drive gear moves the driven side without force being exerted by the pin against the receptacle of the guide plate.

2. The door linkage system of claim 1, wherein proximate to the open and the closed positions, only the drive arm moves the driven side.

3. The door linkage system of claim 1, wherein intermediate to the open and the closed positions, only the drive gear moves the driven side.

4. The door linkage system of claim 1, wherein the driven side includes a door.

5. The door linkage system of claim 1, wherein the receptacle of the guide plate includes a first track, a second track, and a transition area therebetween.

6. The door linkage system of claim 5, wherein the drive arm moves the driven side through cooperation with one of the first track or the second track.

7. The door linkage system of claim 6, wherein the drive gear moves the driven side through cooperation between drive teeth of the drive gear and driven teeth of the driven gear, the drive arm is positioned within the transition area when the drive gear moves the driven side and does not transfer force to the driven side.

8. A door linkage system comprising:
a drive side including a motor, a drive arm, and a drive gear that includes drive teeth between a first toothless area and a second toothless area; and
a driven side including a guide plate in cooperation with the drive arm, a driven gear that includes driven teeth between a third toothless area and a fourth toothless area, and a door movable between an open position and a closed position;
wherein:
the drive side moves the driven side solely with the drive arm when the door is proximate to the open and the closed positions;
the drive side moves the driven side solely through cooperation between the drive teeth and the driven teeth when the door is at an intermediate position between the open and the closed positions; and
the guide plate includes a first track, a second track, and an intermediate area therebetween, movement of the drive arm along the first track and the second track causes the guide plate to rotate, movement of the drive arm across the intermediate area does not cause the guide plate to rotate.

9. The door linkage system of claim 8, wherein the drive arm is in cooperation with the first track when the door is in the open position, the drive arm is in cooperation with the second track when the door is in the closed position, and the drive arm is in cooperation with the intermediate portion when the door is between the open position and the closed position.

10. The door linkage system of claim 8, wherein a distal end of each of the first track and the second track includes a distal portion that is curved to generally match an arc of rotation of the drive arm.

11. The door linkage system of claim 8, wherein the guide plate and the driven gear rotate in unison.

12. A door linkage system comprising:
a motor;
a drive gear including drive teeth, a first toothless area, and a second toothless area, the drive teeth are between the first and the second toothless areas, the drive gear is driven by the motor;
a driven gear including driven teeth configured to mesh with the drive teeth, a third toothless area, and a fourth toothless area, the driven teeth are between the third and the fourth toothless areas;
a drive arm driven by the motor, the drive arm including a first end and a second end opposite thereto, a pin extends from the second end in a direction parallel to an axis of rotation of the drive gear;
a guide plate that rotates with the driven gear, the drive arm is coupled to the guide plate through cooperation between the pin of the drive arm and a first track, a second track, or a transition area of the guide plate; and
a door movable between an open position and a closed position by one of the drive gear or the drive arm;

wherein proximate to the open and the closed positions, the drive arm moves the door by force exerted by the pin against the first track or the second track; and wherein at an intermediate position between the open and the closed positions, the drive gear moves the door without force being exerted by the pin against either the first track or the second track.

13. The door linkage system of claim 12, wherein the transition area is between the first track and the second track.

14. The door linkage system of claim 13, wherein a first distal portion of the first track and a second distal portion of the second track are curved to generally match an arc of rotation of the drive arm.

15. The door linkage system of claim 14, wherein the first track is generally straight between the first distal portion and the transition area, and the second track is generally straight between the second distal portion and the transition area.

16. The door linkage system of claim 12, wherein the guide plate is mounted to the driven gear.

17. The door linkage system of claim 12, wherein the door is mounted to one of the driven gear or the guide plate.

18. The door linkage system of claim 12, wherein the drive gear and the drive arm are simultaneously rotated by the motor in unison.

19. The door linkage system of claim 12, wherein proximate to the open and the closed positions, the drive teeth and the driven teeth do not mesh.

\* \* \* \* \*